US010702909B2

(12) United States Patent
Akashi et al.

(10) Patent No.: US 10,702,909 B2
(45) Date of Patent: Jul. 7, 2020

(54) WORKPIECE CONVEYANCE DEVICE

(71) Applicant: KOMATSU INDUSTRIES CORPORATION, Kanazawa-shi, Ishikawa (JP)

(72) Inventors: Hidetoshi Akashi, Kanazawa (JP); Shigenori Sano, Komatsu (JP)

(73) Assignee: KOMATSU INDUSTRIES CORPORATION, Ishikawa (JP)

( * ) Notice: Subject to any disclaimer, the term of this patent is extended or adjusted under 35 U.S.C. 154(b) by 0 days.

(21) Appl. No.: 16/337,947

(22) PCT Filed: Dec. 1, 2017

(86) PCT No.: PCT/JP2017/043304
§ 371 (c)(1),
(2) Date: Mar. 29, 2019

(87) PCT Pub. No.: WO2018/139056
PCT Pub. Date: Aug. 2, 2018

(65) Prior Publication Data
US 2020/0023421 A1 Jan. 23, 2020

(30) Foreign Application Priority Data

Jan. 30, 2017 (JP) ................. 2017-014542

(51) Int. Cl.
*B21D 43/05* (2006.01)
*B21D 43/18* (2006.01)
(Continued)

(52) U.S. Cl.
CPC ............ *B21D 43/05* (2013.01); *B21D 43/18* (2013.01); *B30B 13/00* (2013.01); *B21D 43/105* (2013.01); *B21K 27/04* (2013.01); *B65G 47/904* (2013.01)

(58) Field of Classification Search
CPC ........ B65G 37/00; B65G 35/00; B65G 47/00; B65G 47/82; B65G 49/0463;
(Continued)

(56) References Cited

U.S. PATENT DOCUMENTS 6,715,981 B1* 4/2004 Harsch .................. B21D 43/05
414/752.1
7,159,438 B2 1/2007 Lauke et al.
(Continued)

FOREIGN PATENT DOCUMENTS

CN 101772835 A 7/2010
CN 102310991 A 1/2012
(Continued)

OTHER PUBLICATIONS

The International Search Report for the corresponding international application No. PCT/JP2017/043304, dated Feb. 27, 2018.
(Continued)

*Primary Examiner* — James R Bidwell
(74) *Attorney, Agent, or Firm* — Global IP Counselors, LLP

(57) ABSTRACT

A workpiece conveyance device is used for a press device. The workpiece conveyance device includes a support component, first and second moving members, a driver, and a transmission mechanism. The support component supports a holder that detachably holds a workpiece. The first moving member pivotably supports the support component. The first and second moving members are movable in the up and down direction. The driver moves the second moving member in the up and down direction. The transmission mechanism transmits an up and down movement of the second
(Continued)

moving member to the first moving member so as to move the first moving member in the up and down direction in conjunction with the up and down movement of the second moving member. The transmission mechanism causes an amount of movement of the first moving member to be greater than an amount of movement of the second moving member.

10 Claims, 15 Drawing Sheets

(51) Int. Cl.
  *B30B 13/00* (2006.01)
  *B21D 43/10* (2006.01)
  *B21K 27/04* (2006.01)
  *B65G 47/90* (2006.01)

(58) Field of Classification Search
  CPC ...... B65G 47/904; B21D 43/00; B21D 43/05; B21D 43/052; B21D 43/055; B21D 55/00; B21D 43/11; B21D 43/18; B21J 11/00; B30B 13/00; B21K 27/04
  USPC .................. 198/346.2, 468.6, 621.1, 468.8; 414/752.1, 737, 751.1, 744.8
  See application file for complete search history.

(56) References Cited

U.S. PATENT DOCUMENTS

| | | | | |
|---|---|---|---|---|
| 7,316,149 | B2 * | 1/2008 | Baba | B21D 43/05 198/621.1 |
| 7,562,765 | B2 * | 7/2009 | Dodo | B21D 43/11 198/468.01 |
| 7,849,995 | B2 * | 12/2010 | Reichenbach | B65G 47/901 198/346.2 |
| 2003/0084701 | A1 | 5/2003 | Kawamoto | |
| 2010/0189533 | A1 | 7/2010 | Segawa et al. | |
| 2013/0309050 | A1 | 11/2013 | Takeda | |

FOREIGN PATENT DOCUMENTS

| | | |
|---|---|---|
| CN | 104703753 A | 6/2015 |
| CN | 105269564 A | 1/2016 |
| CN | 105270863 A | 1/2016 |
| DE | 197 09 585 A1 | 9/1998 |
| DE | 102 02 348 A1 | 7/2003 |
| JP | 2003-136163 A | 5/2003 |
| JP | 2013-237081 A | 11/2013 |

OTHER PUBLICATIONS

The Office Action for the corresponding Chinese application No. 201780062748.6, dated Jan. 13, 2020.

* cited by examiner

WORKPIECE CONVEYANCE DEVICE

CROSS-REFERENCE TO RELATED APPLICATIONS

This application is a U.S. National stage application of International Application No. PCT/JP2017/043304, filed on Dec. 1, 2017. This U.S. National stage application claims priority under 35 U.S.C. § 119(a) to Japanese Patent Application No. 2017-014542, filed in Japan on Jan. 30, 2017, the entire contents of which are hereby incorporated herein by reference.

BACKGROUND

Field of the Invention

The present invention relates to a workpiece conveyance device.

Background Information

Tandem press lines have been widely used in recent years because they afford more flexible operation than a transfer press, and because technological innovation has increased their speed (see, for example, Patent Literature 1).

With the workpiece conveyance device in U.S. Pat. No. 7,159,438, the proximal end of a first lever is attached to a carrier that is moved up and down by a ball screw mechanism so that the first lever is capable of pivoting, and a second lever is attached so as to be capable of pivoting at the distal end of the first lever. A crossbar is attached to the distal end of the second lever, and holders (suction cups or the like) that hold a workpiece are attached to the crossbar. As the carrier moves up and down, the first lever and the second lever pivot, and the workpiece is conveyed.

SUMMARY

However, in recent years there has been a need for even higher speed in press lines, and higher speed in workpiece conveyance devices has been sought. In order to achieve this higher conveyance speed, it is necessary to raise the speed at which the carrier moves up and down, but with the elevating mechanism in the above-mentioned U.S. Pat. No. 7,159,438, this is accomplished merely by raising the rotational speed of the motor, and the speed could not be increased enough to meet the demands of the marketplace.

In view of the above-mentioned problems encountered in the past, it is an object of the present invention to provide a workpiece conveyance device with which the workpiece conveyance speed can be raised.

The workpiece conveyance device according to a first aspect is a workpiece conveyance device used for a press device, and comprises a support component, a first moving member, a second moving member, a driver, and a transmission mechanism. The support component supports holders that detachably hold a workpiece. The first moving member is able to move in the up and down direction and pivotably supports the support component. The second moving member is able to move in the up and down direction. The driver moves the second moving member in the up and down direction. The transmission mechanism transmits the up and down movement of the second moving member to the first moving member so as to move the first moving member in the up and down direction in conjunction with the up and down movement of the second moving member, and makes the amount of movement of the first moving member greater than the amount of movement of the second moving member.

The present invention provides a workpiece conveyance device with which the conveyance speed of a workpiece can be raised.

DETAILED DESCRIPTION OF EMBODIMENT(S)

The workpiece conveyance device in an embodiment of the present invention will now be described through reference to the drawings.

1. Configuration 1-1. Press System 100

Figure 1:
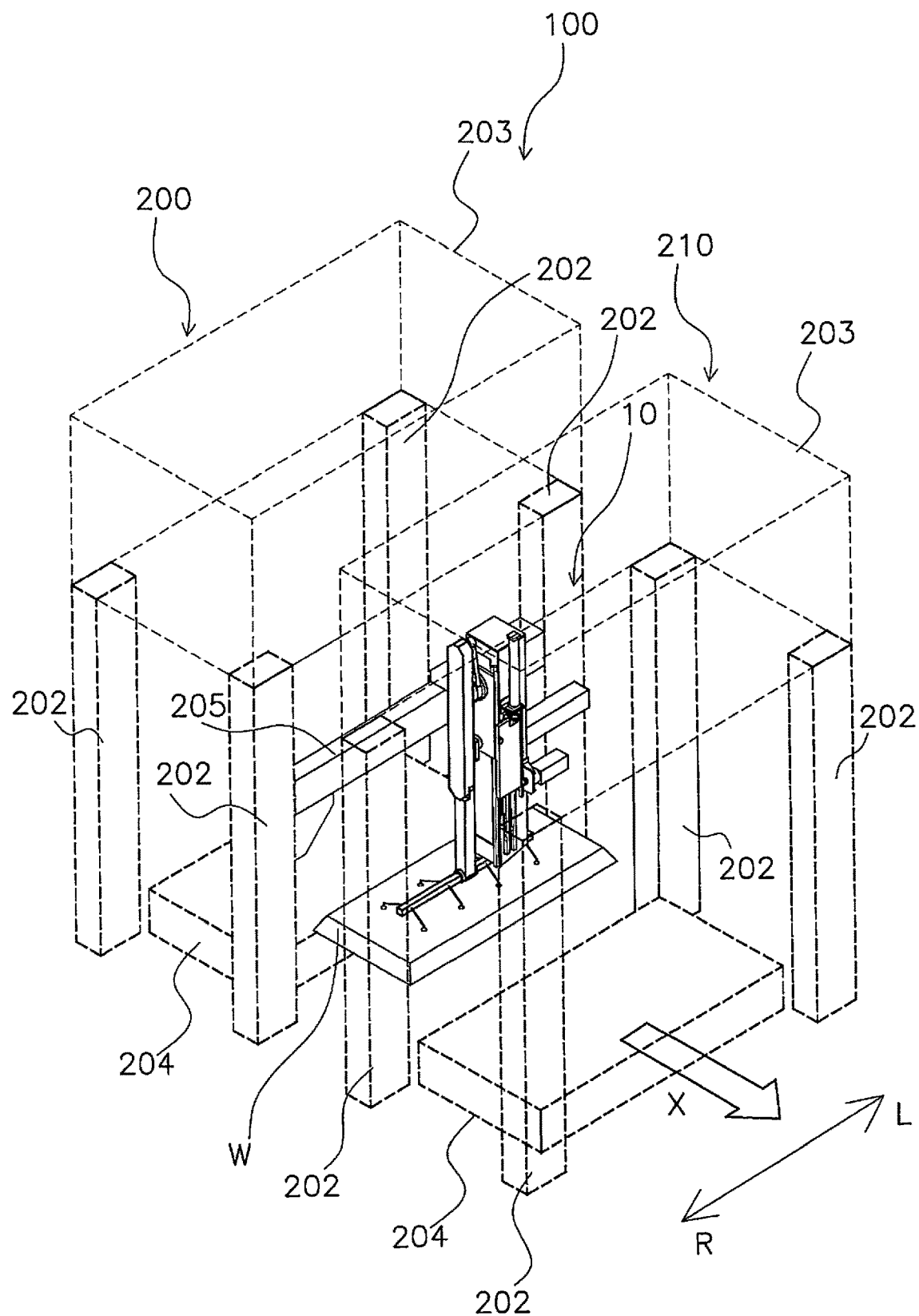
FIG. 1 is a diagram of a press system using a workpiece conveyance device in an embodiment according to the present invention.

FIG. 1 is a simplified diagram of the configuration of a press system 100 using the workpiece conveyance device 10 of this embodiment.

The press system 100 comprises a first press device 200, a second press device 210, and a workpiece conveyance device 10 that is provided between the first press device 200 and the second press device 210. The first press device 200 and the second press device 210 are disposed along the conveyance direction X of the workpiece.

The press devices 200 and 210 each mainly have uprights 202, a crown 203, and a bolster 204.

The uprights 202 are columnar members, four of which are disposed on a bed (not shown). The four uprights 202 are disposed so as to form the apexes of a rectangle in plan view.

The crown 203 is supported above by the four uprights 202. In FIG. 1, the crown 203, the uprights 202, and the bolster 204 are indicated by dotted lines in order to make the workpiece conveyance device 10 easier to see. A slide (not shown) hangs down from the crown 203. The crown 203 is provided with a slide driver that moves the slide up and down. An upper mold is detachably attached to the lower side of the slide.

The bolster 204 is disposed between the uprights 202 and under the slide. A lower mold is disposed on the upper side of the bolster 204.

In the above configuration, as the slide moves toward the bolster 204, pressing is performed between the upper die and the lower die.

The workpiece conveyance device 10 is provided between the first press device 200 and the second press device 210, takes out a workpiece from the first press device 200 on the upstream side in the conveyance direction X, and conveys the workpiece W to the second press device 210 on the downstream side.

1-2. Workpiece Conveyance Device 10

As shown in FIG. 1, an attachment frame 205 is provided between the two uprights 202 on the downstream side in the press device 200 on the upstream side. The attachment frame 205 is fixed to the two uprights 202 and supports the workpiece conveyance device 10.

Figure 2:
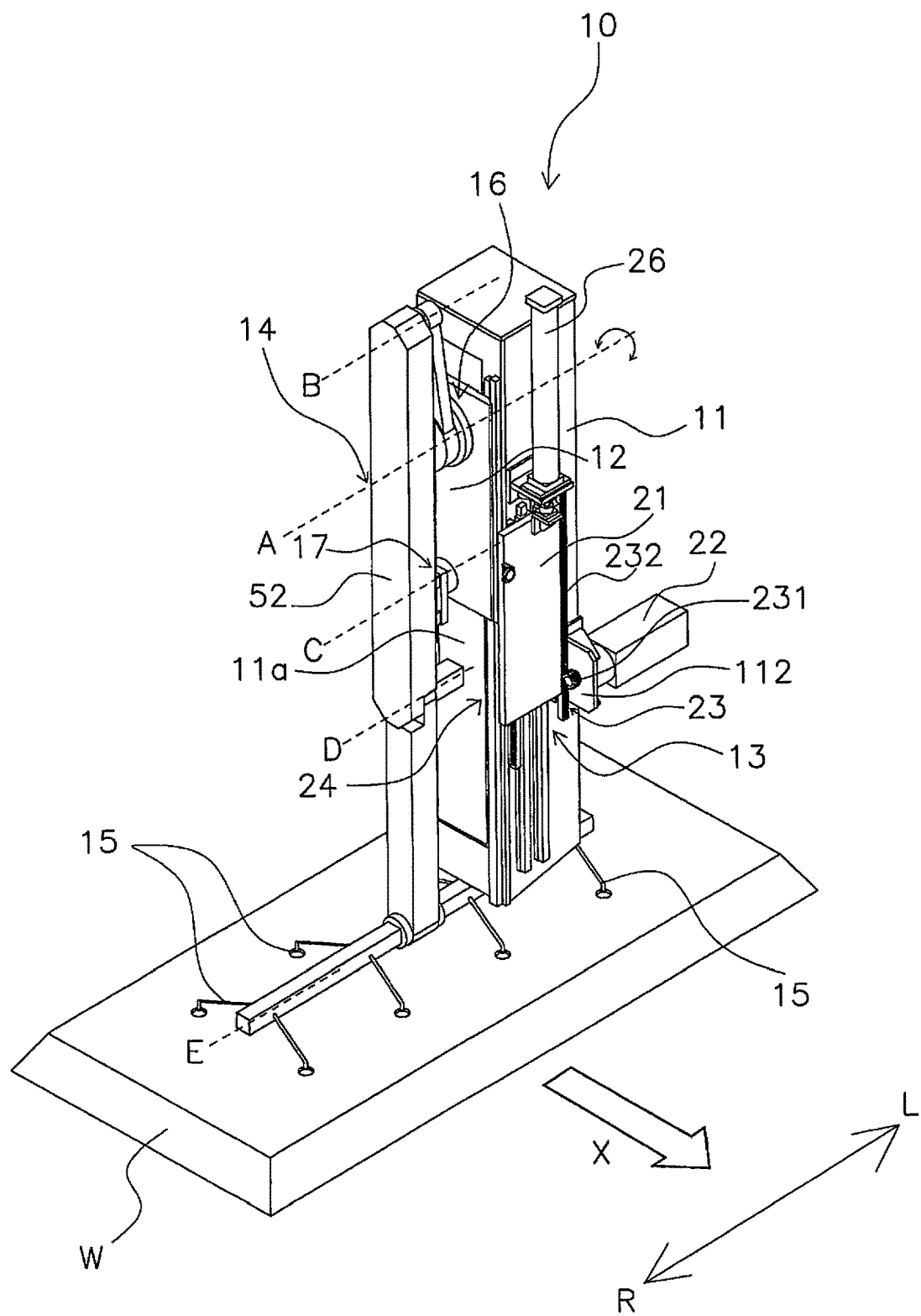
FIG. 2 is an oblique view of the workpiece conveyance device in FIG. 1 as seen from the right side.
Figure 3:
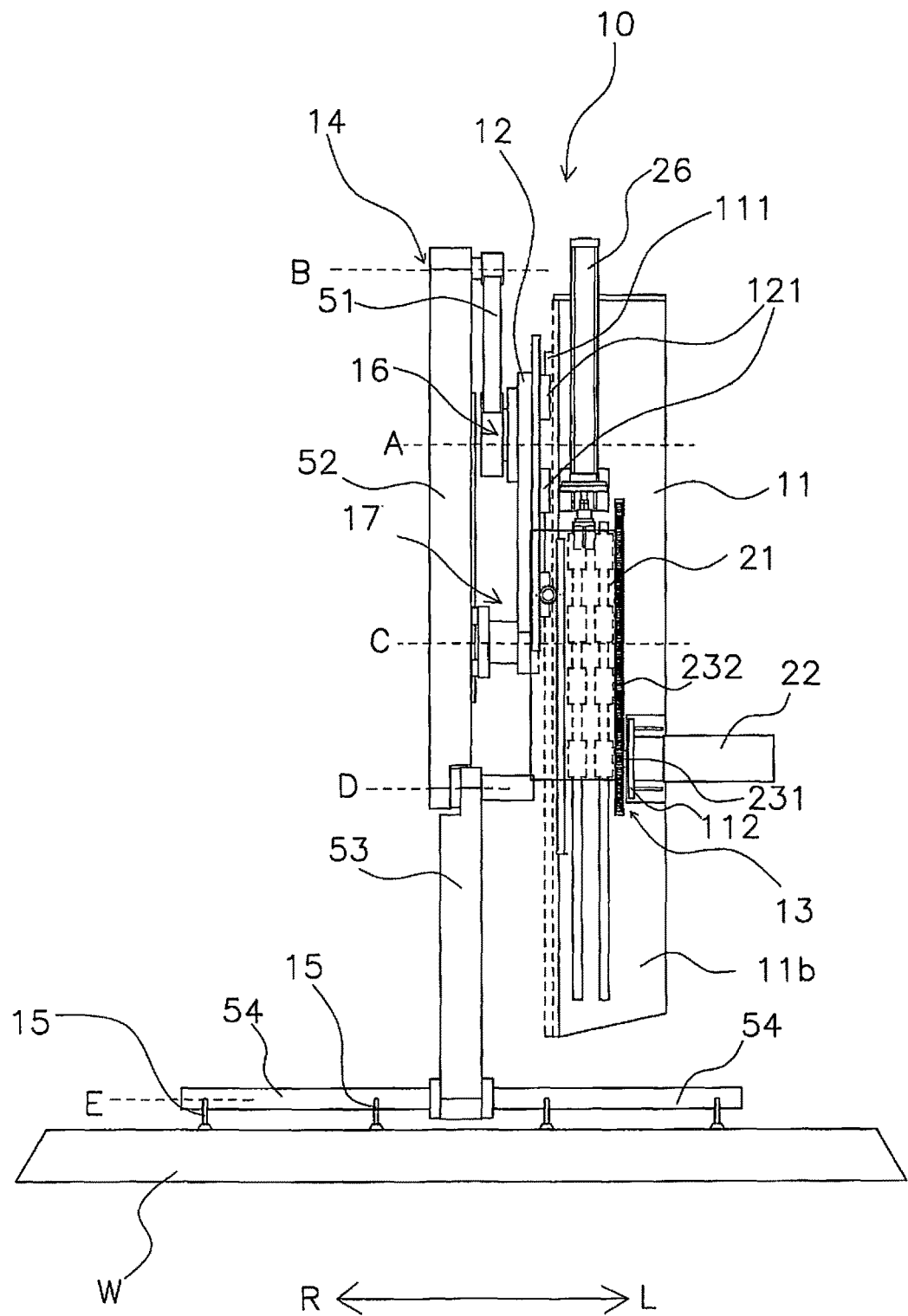
FIG. 3 is a front view of the workpiece conveyance device in FIG. 2 as seen from the downstream side in the conveyance direction.
Figure 4:
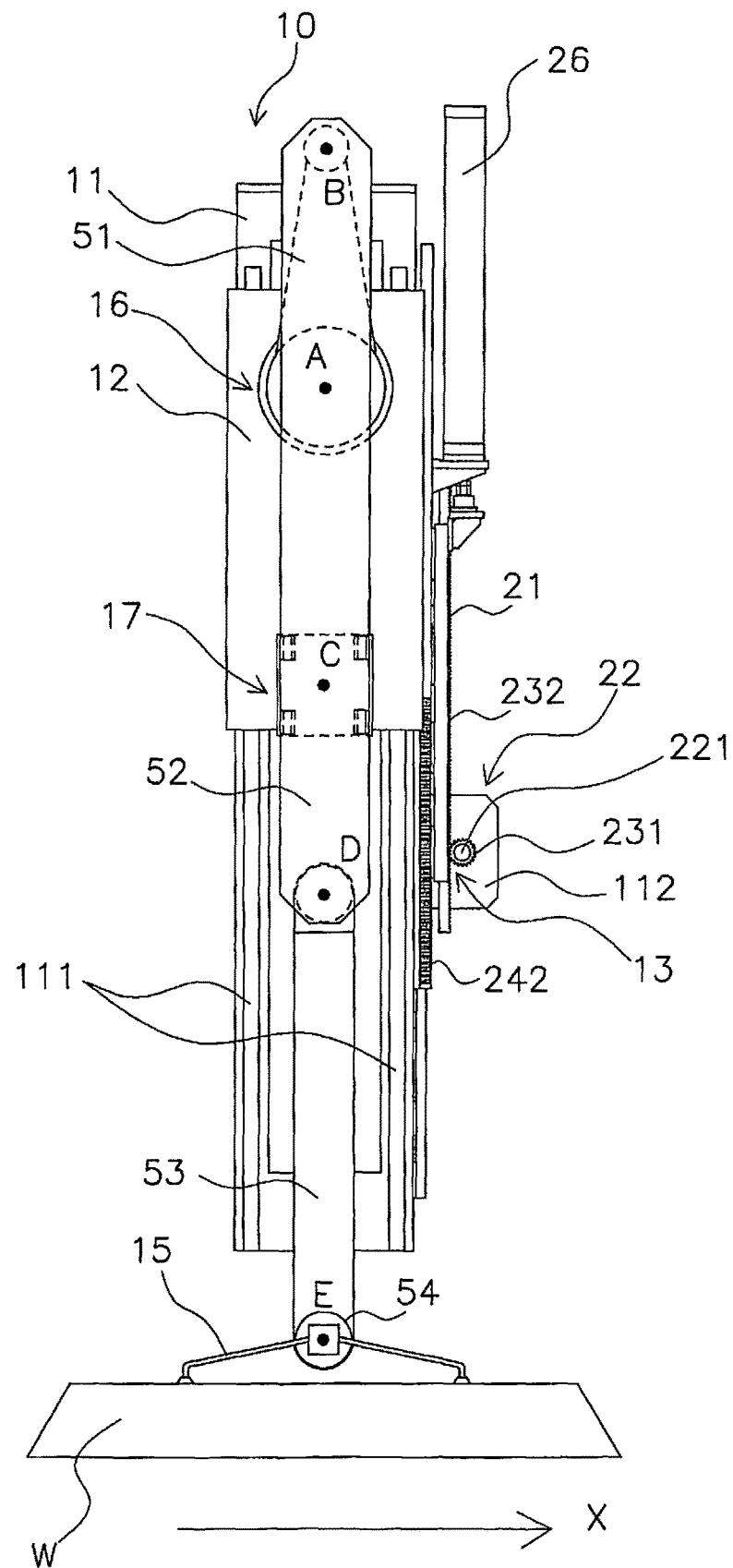
FIG. 4 is a right side view of the workpiece conveyance device in FIG. 2.

FIG. 2 is an oblique view of the workpiece conveyance device 10 as seen from the right side. FIG. 3 is a front view of the workpiece conveyance device 10 as seen from the downstream side in the conveyance direction X. FIG. 4 is a right side view of the workpiece conveyance device 10. Here, the "right side" refers to the right side facing in the conveyance direction X, and is indicated by the arrow R. The left side facing in the conveyance direction X is indicated by the arrow L.

As shown in FIG. 2, the workpiece conveyance device 10 in this embodiment mainly has a carrier support frame 11 (an example of a frame), a lift carrier 12 (an example of a first moving member), a carrier drive mechanism 13, and a lever unit 14 (an example of a support component).

The carrier support frame 11 supports the lift carrier 12 and the carrier drive mechanism 13. The lift carrier 12 is able to move up and down with respect to the carrier support frame 11. The carrier drive mechanism 13 raises and lowers the lift carrier 12. Holders 15 for holding the workpiece W are detachably attached to the lever unit 14. The lever unit 14 is supported by the lift carrier 12 and is moved up and down by raising and lowering of the lift carrier 12.

1-3. Carrier Support Frame 11

As shown in FIG. 1, the carrier support frame 11 is fixed at its upper part to the attachment frame 205. The carrier support frame 11 has a substantially cuboid shape, and is formed longer facing downward. The carrier support frame 11 supports the carrier drive mechanism 13, and also supports the lift carrier 12 movably in the up and down direction.

1-4. Lift Carrier 12

As shown in FIGS. 2 and 4, the lift carrier 12 is a substantially flat member, and is disposed substantially parallel to the right side face 11a, on the right side face 11a side in the conveyance direction X of the carrier supporting frame 11. The lift carrier 12 supports the lever unit 14 (discussed below).

Figure 5:
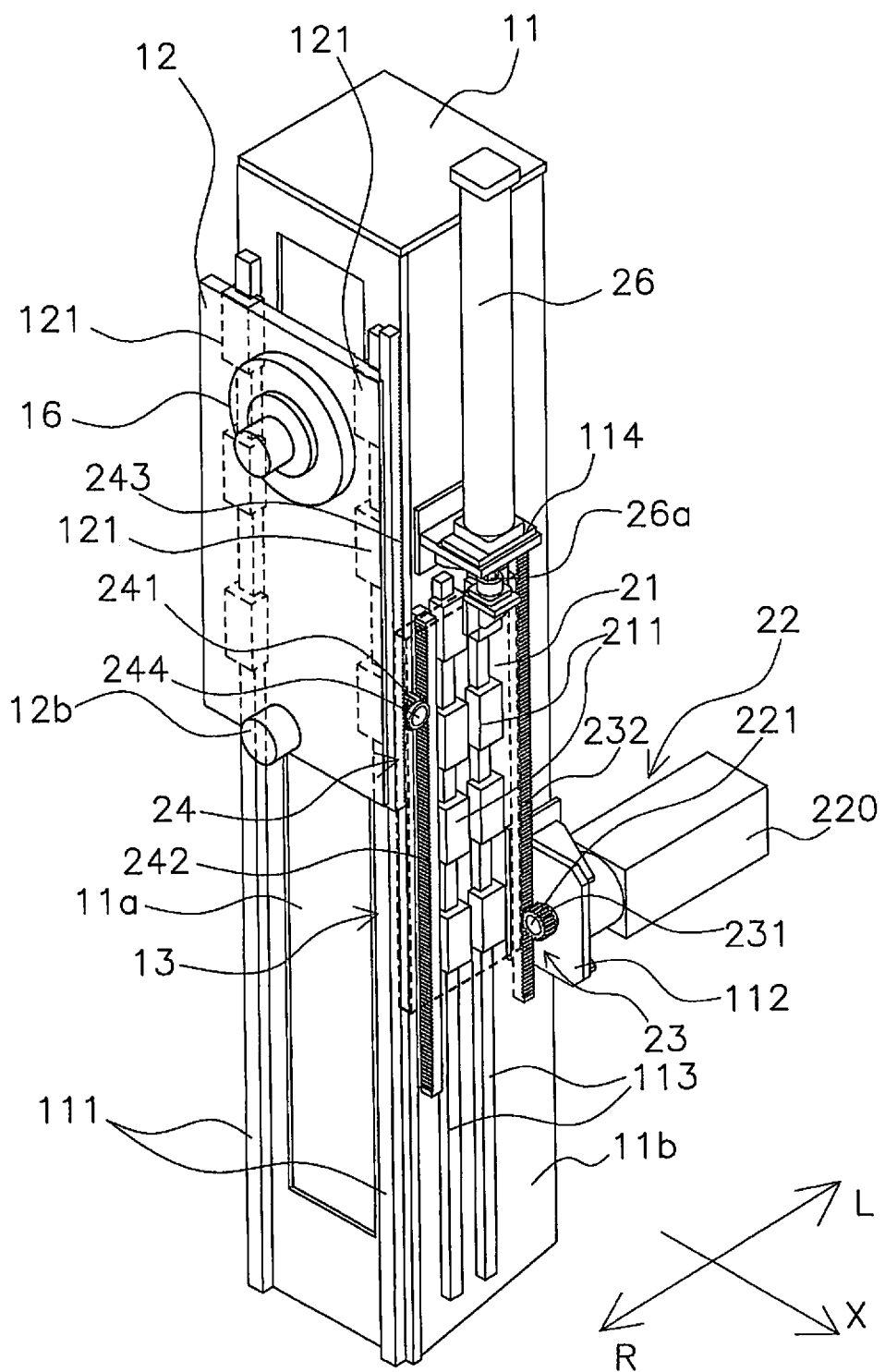
FIG. 5 is an oblique view of the state when the lever unit has been detached from the workpiece conveyance device in FIG. 2.

FIG. 5 is an oblique view of the workpiece conveyance device 10 with the lever unit 14 removed.

Two slide rails 111 are provided, running vertically, to the right side face 11a of the carrier support frame 11. As shown in FIGS. 3 and 5, a plurality of slide guides 121 are provided to the face on the carrier support frame 11 side of the lift carrier 12 (the face on the left direction L side), and mate with the slide rails 111 of the carrier support frame 11.

With this configuration, the lift carrier 12 is supported movably up and down by the carrier support frame 11. The carrier drive mechanism 13 for raising and lowering the lift carrier 12 will be described in detail below.

As shown in FIG. 5, a first lever support part 16 is attached to the upper part of the lift carrier 12. The lift carrier 12 has a fulcrum shaft 12b for attaching a carrier base 173 of a second lever support part 17 to its lower part.

1-5. Lever Unit 14, First Lever Support Part 16, Second Lever Support Part 17

Figure 6:
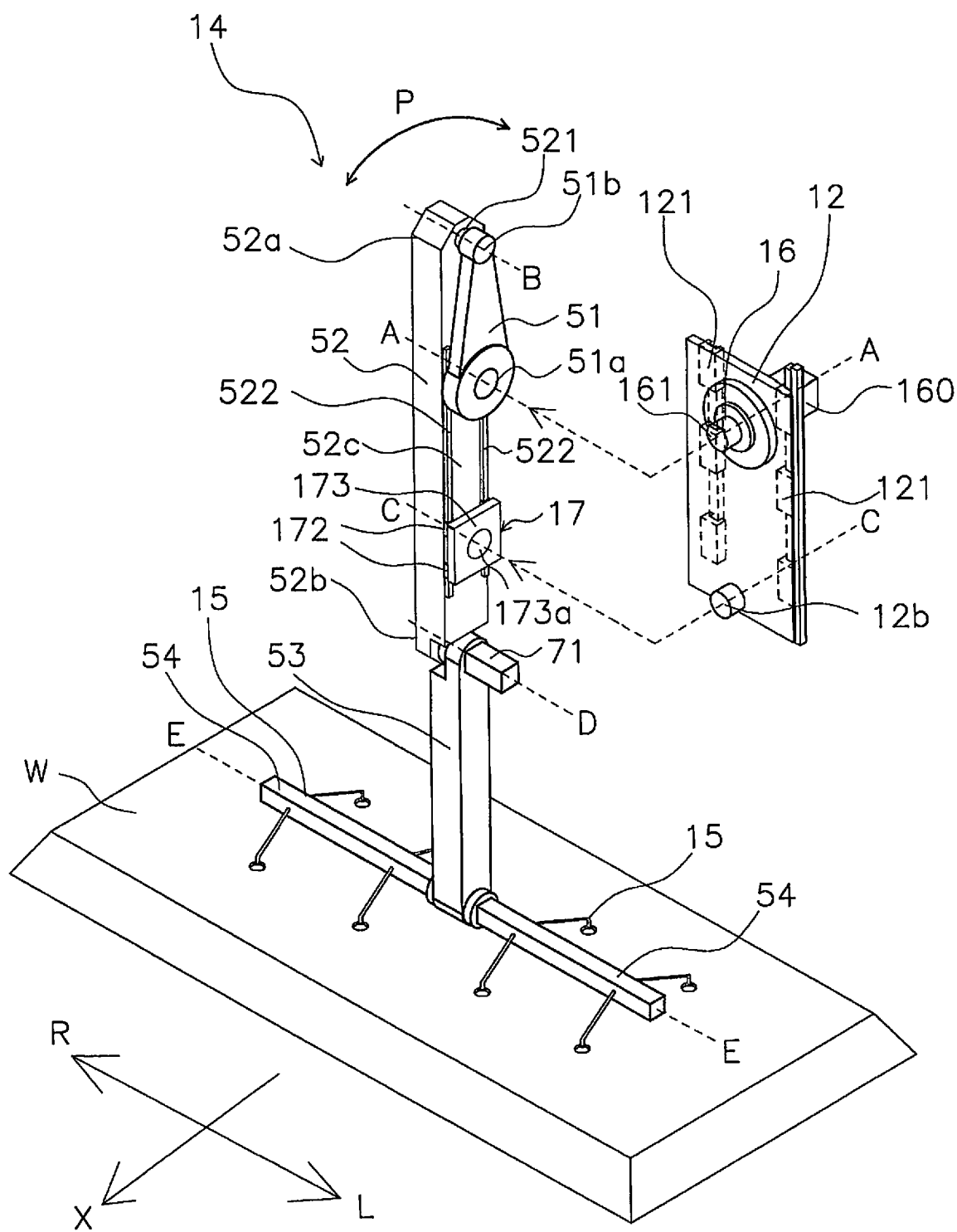
FIG. 6 is an exploded oblique view of the workpiece conveyance device in FIG. 2.

FIG. 6 is an exploded oblique view of the workpiece conveyance device 10. For the purpose of explanation, in FIG. 6 the orientation in the oblique view of the lift carrier 12 is different from that in the oblique view of the lever unit 14 and the second lever support part 17.

As shown in FIGS. 3, 4, and 6, the lever unit 14 mainly has a first lever 51, a slider arm 52, a second lever 53, and a crossbar 54. The first lever 51, the slider arm 52, the second lever 53, and the crossbar 54 are linked in that order from the lift carrier 12 side.

As shown in FIG. 6, the first lever 51 is pivotably supported at its proximal end 51a by the lift carrier 12 via the first lever support part 16. The first lever 51 is rotatably linked at its distal end 51b to a rotating shaft 521 provided to the slider arm 52. The rotary shaft 521 is disposed on the left side (the arrow L side) of the slider arm 52, and is formed toward the left direction L.

The first lever support part 16 is connected to the left side (arrow L) of the proximal end 51a of the first lever 51 (see the arrow in FIG. 6). The first lever support part 16 has a drive shaft 161 and a driver 160 that rotates the drive shaft 161. The drive shaft 161 protrudes from the surface on the right side (arrow R) of the lift carrier 12, and is inserted into and fixed to the proximal end 51a of the first lever 51. As shown in FIG. 6, the driver 160 is fixed to the face of the lift carrier 12 to which the slide guides 121 are provided (the face on the left direction (arrow L) side). The driver 160 has a servo motor, a reduction gear, etc. The rotational axis of the servo motor is disposed along the left and right direction (arrow LR). The reduction gear decelerates the rotation of the servo motor and transmits it to the first lever 51. The rotation of the servo motor causes the first lever 51 to pivot around the rotational axis of the servo motor (axis A).

The slider arm 52 is rotatably linked to the distal end 51b of the first lever 51. As shown in FIG. 6, the rotating shaft 521 is formed at the upper end 52a of the slider arm 52. The rotating shaft 521 is inserted into a hole formed in the distal end 51b of the first lever 51. Consequently, the first lever 51 and the slider arm 52 are linked to each other so as to be rotatable around the axis B.

As shown in FIGS. 2 and 6, the second lever support part 17 is provided on the left side face side (the direction of arrow L) of the slider arm 52. The second lever support part 17 mainly has guides 172 (such as linear guides) and the carrier base 173.

As shown in FIG. 6, four guides 172 are provided, and two each of these mate with one of the two rails 522 (see FIG. 6) disposed on the left side face 52c of the slider arm 52 along the lengthwise direction. The guides 172 slide along the rails 522.

The carrier base 173 is fixed to the plurality of guides 172, and slides relative to the slider arm 52 as the guides 172 move.

A hole 173a is formed in the carrier base 173, and a cross roller bearing is disposed around the hole 173a. As shown in FIG. 6, the fulcrum shaft 12b of the lift carrier 12 is fitted in the hole 173a. Thus, the configuration is such that the cross roller bearing allows the carrier base 173 to rotate around the axis C with respect to the lift carrier 12.

That is, the carrier base 173 is configured to be rotatable with respect to the lift carrier 12 and to be slidable with respect to the slider arm 52.

The second lever 53 is pivotably linked to the lower end 52b of the slider arm 52.

As shown in FIG. 6, a driver 71 that pivots the second lever 53 is provided to the lower end 52b of the slider arm 52 and the upper end of the second lever 53. The driver 71 has a rotary motor (servo motor) and a reduction gear that decelerates the rotation of the rotary motor (servo motor), and transmits the decelerated rotation to the second lever 53. The rotational drive of this rotary motor causes the second lever 53 to pivot with respect to the slider arm 52 around the axis D running along the left and right direction (LR direction) (see the arrow T in FIG. 6).

The crossbar 54 is provided along the left and right direction (LR direction), at the lower end of the second lever 53. As shown in FIG. 6, the crossbar 54 consists of a pair of left and right pieces, which are linked to the lower end of the second lever 53 via a driver (not shown). The driver has a servo motor and a reduction gear. The rotational drive of the servo motor causes the crossbars 54 to rotate around the axis E running along the left and right direction (LR direction).

The crossbars 54 are provided with holders 15 for holding the workpiece W. In this embodiment, the holders 15 have suction pads, but this is not the only option.

1-6. Carrier Drive Mechanism

Next, the above-mentioned carrier drive mechanism 13 for raising and lowering the lift carrier 12 will be described.

As shown in FIG. 5, the carrier drive mechanism 13 has a middle carrier 21 (see FIG. 2), a driver 22, a conversion mechanism 23, a transmission mechanism 24, and a balancer cylinder 26. In FIG. 5, the middle carrier 21 (see FIG. 2) is indicated by a dotted line for the purpose of explanation, and its inner configuration is shown.

The driver 22 has an electric motor 220 serving as a drive source for moving the middle carrier 21 in the up and down direction. The conversion mechanism 23 converts the rotary motion of the electric motor 220 into up-and-down motion and transmits it to the middle carrier 21. The transmission mechanism 24 transmits the movement of the middle carrier 21 to the lift carrier 12 so that the lift carrier 12 moves up and down together with the middle carrier 21. The balancer cylinder 26 imparts an upward force to the middle carrier 21.

1-6-1. Middle Carrier

The middle carrier 21 is a substantially flat member, and as shown in FIG. 5, it is disposed on the side face 11b and substantially parallel to the side face 11b on the downstream side of the carrier support frame 11. The middle carrier 21 is configured to be movable in the up and down direction with respect to the carrier support frame 11 by means of slide rails 113 and slide guides 211. A pair of the slide rails 113 is fixed to the side face 11b along the up and down direction. Eight of the slide guides 211 are fixed to the face of the middle carrier 21 on the carrier support frame 11 side, and four slide guides 211 mate with each of the slide rails 113.

1-6-2. Driver

The driver 22 has the electric motor 220 (such as a servo motor) and a reduction gear, and is attached to the carrier support frame 11 via a bracket 112. The electric motor 220 is disposed at the side face 11b of the carrier support frame 11 at the end on the left direction L side such that its rotation shaft 221 runs along the left and right direction (see the arrow LR).

1-6-3. Conversion Mechanism

The conversion mechanism 23 has a pinion 231 and a rack 232. The pinion 231 is fixed to the rotation shaft 221 of the electric motor 220 of the driver 22. The rack 232 is fixed to the end face on the left direction L side of the middle carrier 21, and is disposed running along the up and down direction. The portion where the teeth of the pinion 231 are formed is disposed facing the downstream side in the conveyance direction X, and meshes with the pinion 231.

When the electric motor 220 of the driver 22 rotates, the pinion 231 also rotates, so the middle carrier 21 supported by the rack 232 moves in the up and down direction along the slide rails 113 together with the rack 232.

1-6-4. Transmission Mechanism

The transmission mechanism 24 has a pinion 241, a rack 242, and a rack 243. The pinion 241 is rotatably supported by the middle carrier 21. The pinion 241 is fixed to a shaft 244 rotatably supported by the middle carrier 21. The shaft 244 is disposed near the end on the right direction R side of the middle carrier 21, parallel to the conveyance direction X. The pinion 241 is disposed between the middle carrier 21 and the side face 11b of the carrier support frame 11.

The rack 242 is fixed to the side face 11b of the carrier support frame 11. The rack 242 is disposed on the left direction L side of the pinion 241 and running along the up and down direction. The portion of the rack 242 where the teeth are formed faces the right direction R side and meshes with the pinion 241.

The rack 243 is fixed along the up and down direction to the end of the lift carrier 12 on the downstream side in the conveyance direction X. The portion of the rack 243 where the teeth are formed faces the left direction L side, and meshes with the pinion 241. That is, the rack 242 and the rack 243 are disposed facing each other, and the pinion 241 is disposed between the rack 242 and the rack 243.

1-6-5. Balancer Cylinder

The balancer cylinder 26 is fixed to the side face 11b of the carrier support frame 11 via a bracket 114. The balancer cylinder 26 is disposed on the upper side of the middle carrier 21, and is disposed so that the extension direction of a rod 26a runs along the up and down direction. The lower end of the rod 26a is fixed to the middle carrier 21.

2. Operation

Next, the operation of the workpiece conveyance device 10 in an embodiment of the present invention will be described.

2-1. Up and Down Movement of Lift Carrier 12

Before describing the overall movement of the workpiece conveyance device 10, the movement of the lift carrier 12 in the up and down direction will be described.

Figure 7:
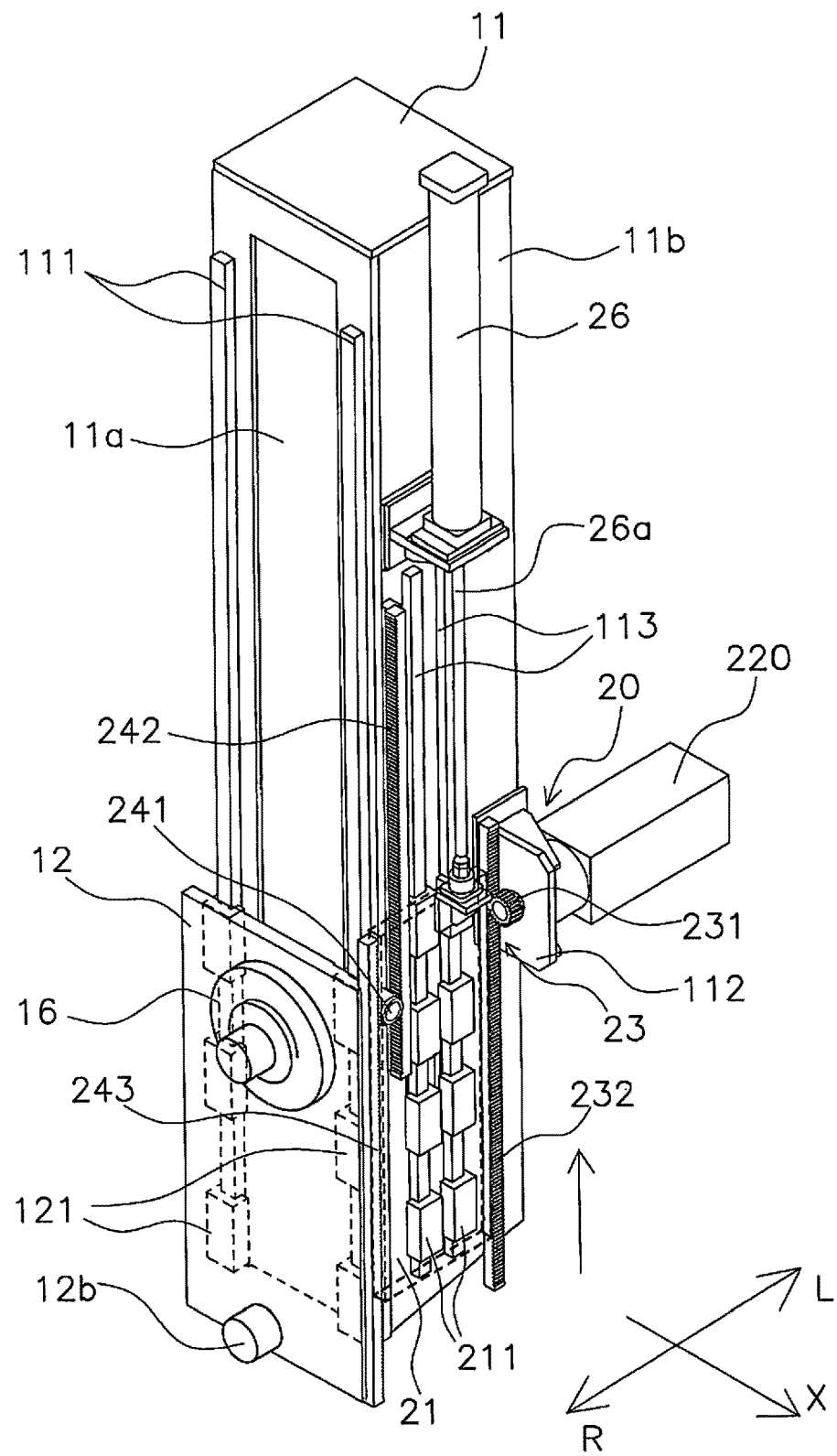
FIG. 7 is a view of the state when the lift carrier has moved downward from its position in FIG. 5.

FIG. 7 is a diagram of the state when the lift carrier 12 has moved downward. In FIG. 7, the middle carrier 21 (see FIG. 2) is indicated by a dotted line for the purpose of explanation, and its inner configuration is shown.

When the electric motor 220 of the drive unit 22 is driven from the state shown in FIG. 7 and the pinion 231 is rotated clockwise as viewed from the right direction R side, the rack 232 moves upward. Since the rack 232 is fixed to the middle carrier 21, the middle carrier 21 also moves upward.

As the middle carrier 21 moves upward, the pinion 241 meshed with the rack 242 fixed to the carrier support frame 11 rotates clockwise as viewed from the downstream side in the conveyance direction X.

The clockwise rotation of the pinion 241 causes the rack 243 to move upward. Since the rack 243 is fixed to the lift carrier 12, the lift carrier 12 also moves upward together with the movement of the rack 243.

Figure 8:
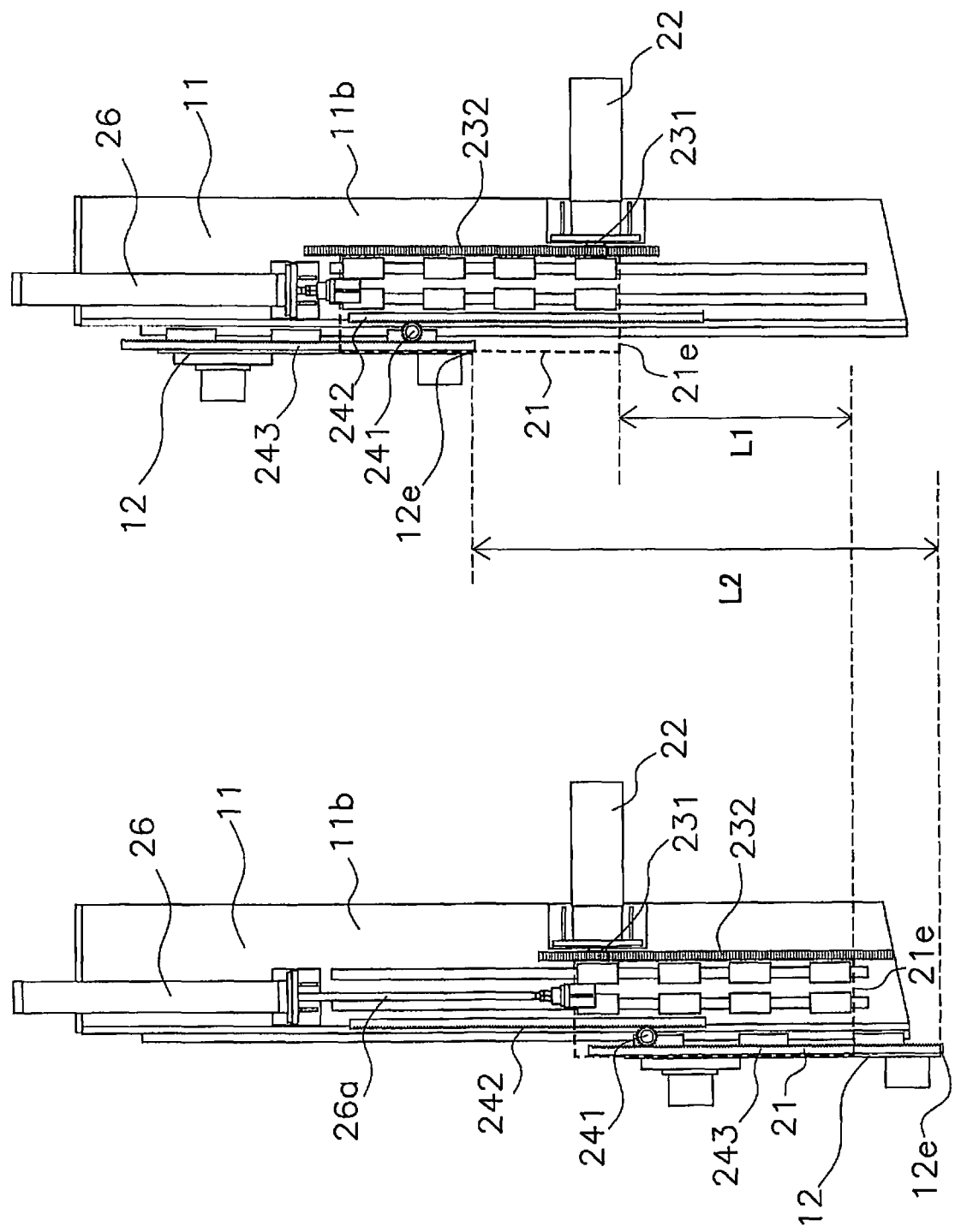
FIG. 8 is a diagram illustrating the difference in the amount of movement between the lift carrier and the middle carrier.

The amount of upward movement of the middle carrier 21 and the lift carrier 12 here will be described through reference to FIG. 8. Also in FIG. 8, for the sake of explanation, the middle carrier 21 is indicated by a dotted line, and its inner configuration is shown. The left side in FIG. 8 is a diagram showing the state when the lift carrier 12 is at its lowermost point. The right side in FIG. 8 is a diagram showing the state when the lift carrier 12 is at its uppermost point.

As shown in the diagrams on the left and right sides in FIG. 8, the middle carrier 21 is moved upward by an amount of L1 by the rotation of the electric motor 220 of the drive section 22. In FIG. 8, L1 indicates the distance that the lower end 21e of the middle carrier 21 has moved upward. The pinion 241 rotatably fixed to the middle carrier 21 is also rotated a distance of L1 by the rack 242 fixed to the carrier support frame 11. Since the rack 243 is moved upward by this rotation of the pinion 241 by the distance L1, the lift carrier 12 also moves upward by the distance L1 with respect to the middle carrier 21. When the lift carrier 12 has moved by L1 with respect to the middle carrier 21, the middle carrier 21 moves upward by L1 with respect to the carrier support frame 11.

That is, the lift carrier 12 moves by L2 in relation to the carrier support frame 11, which is a distance approximately twice the movement amount L1 of the middle carrier 21. In FIG. 8, L2 indicates the distance of upward movement of the lower end 12e of the lift carrier 12.

Thus, since the lift carrier 12 moves at a speed and distance that is twice the speed and distance corresponding to the rotational speed of the electric motor 220 of the driver 22, the conveyance speed of the workpiece W of the workpiece conveyance device 10 can be increased.

The operation when descending is the reverse of the operation when ascending.

2-2. Overall Operation of Workpiece Conveyance Device

Figure 9:
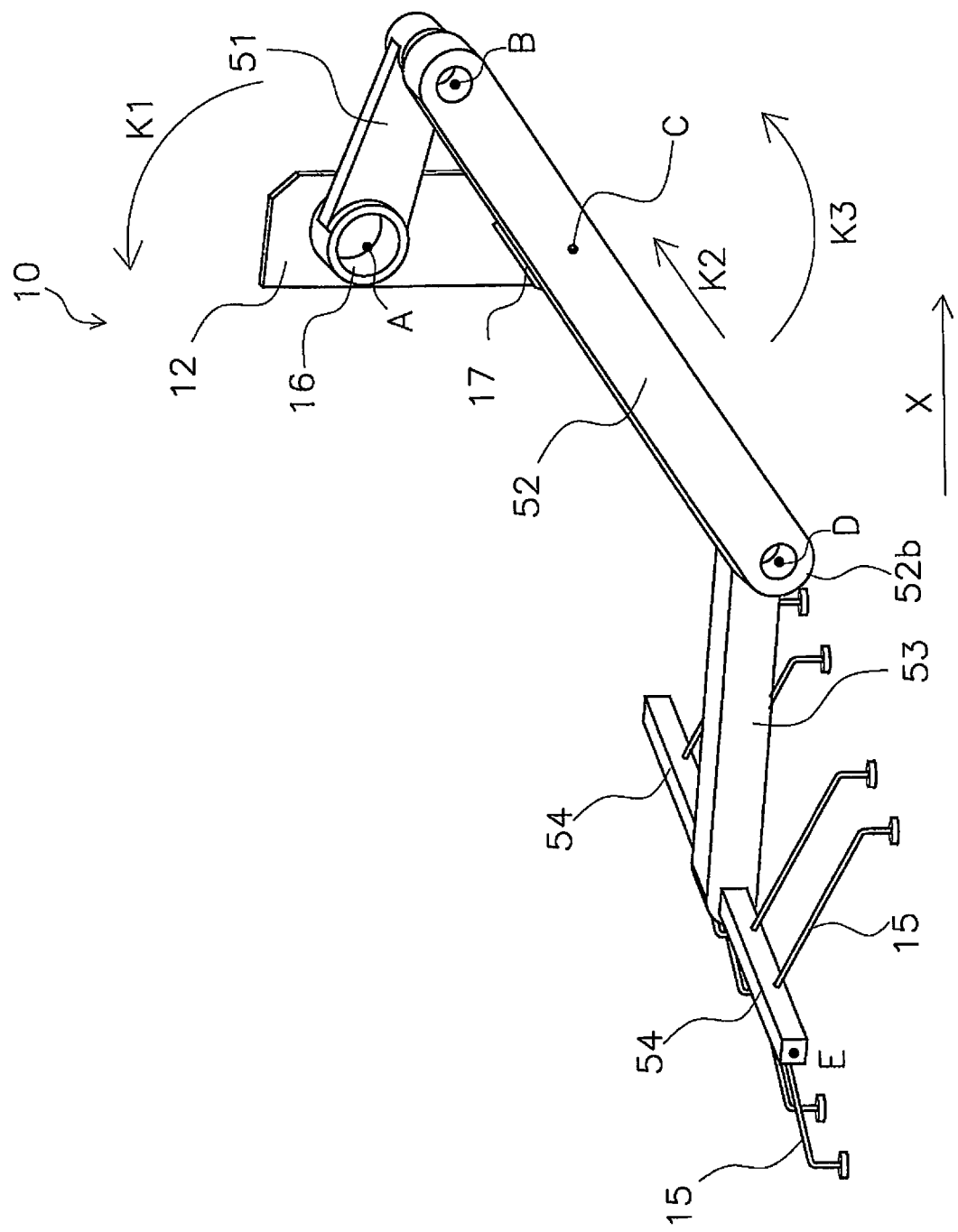
FIG. 9 is a diagram showing the operation of the workpiece conveyance device according to an embodiment of the present invention.
Figure 10:
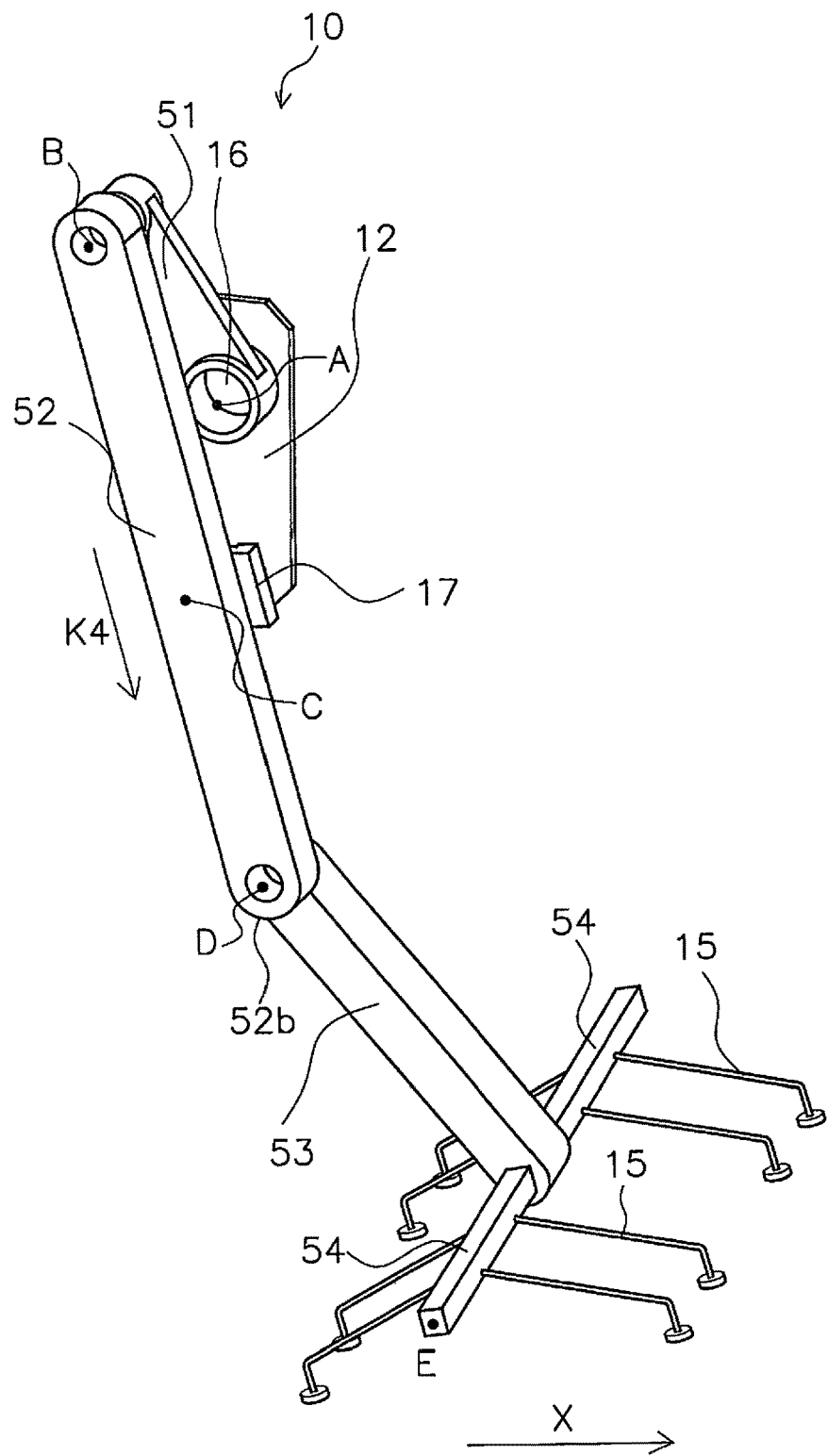
FIG. 10 is a diagram showing the operation of the workpiece conveyance device according to an embodiment of the present invention.
Figure 11:
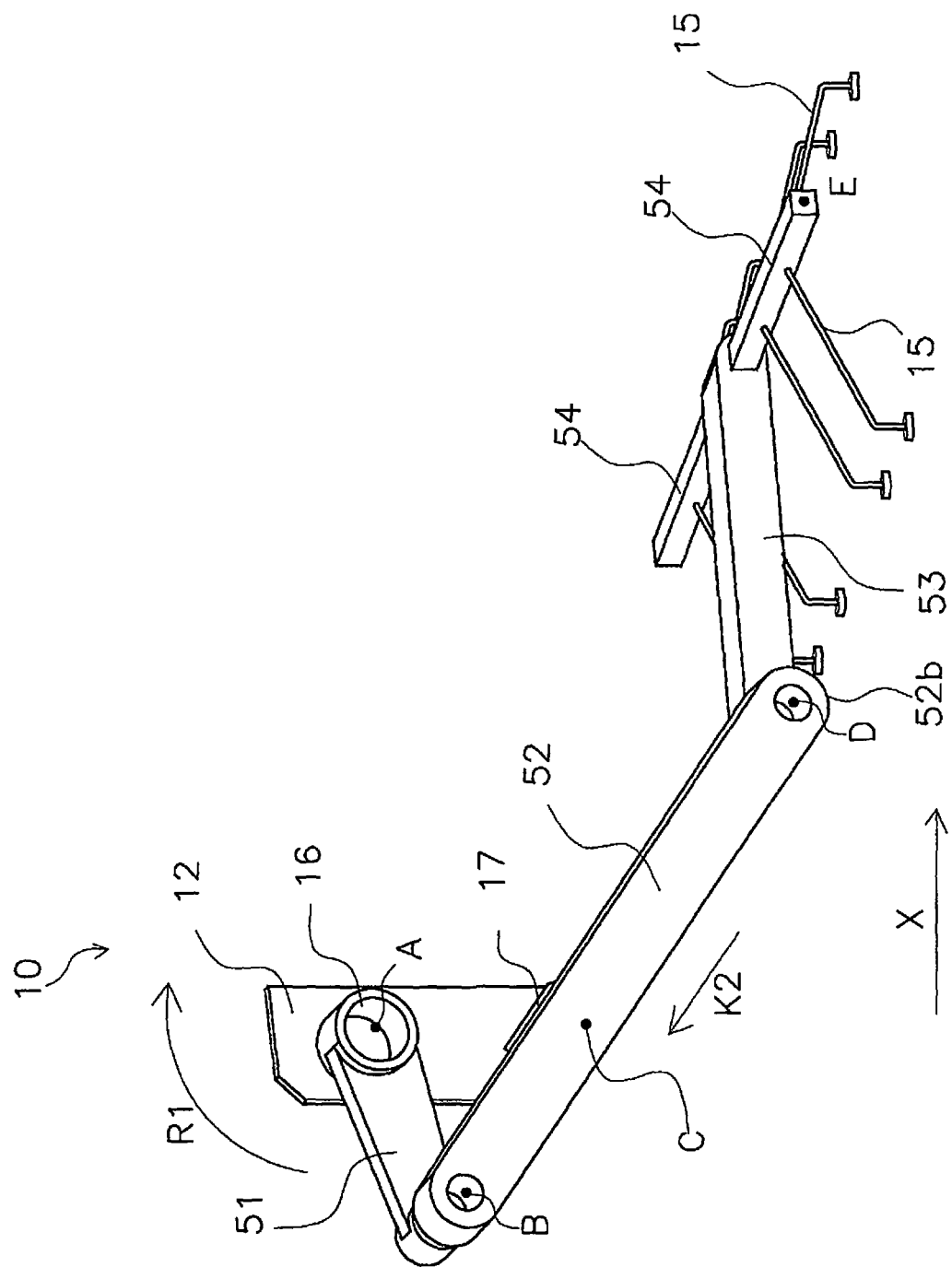
FIG. 11 is a diagram showing the operation of the workpiece conveyance device according to an embodiment of the present invention.
Figure 12:
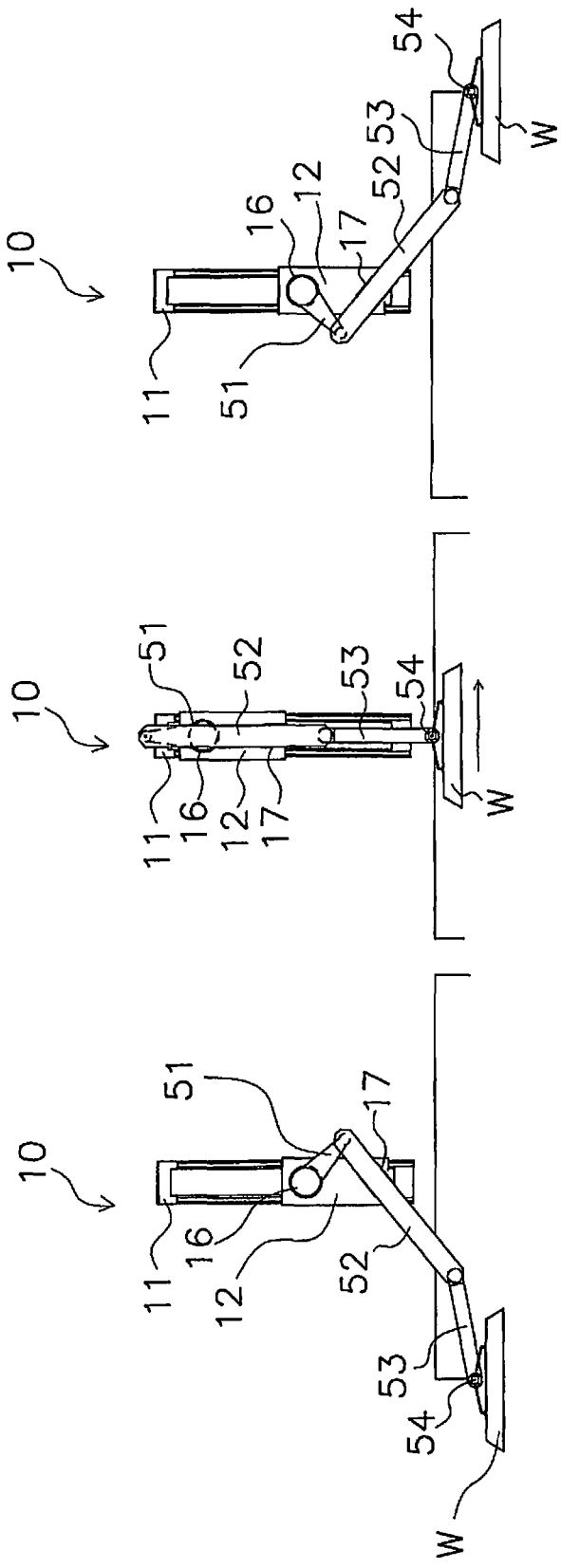
FIGS. 12A, 12B, and 12C are simplified side views of the workpiece conveyance device 10 in states corresponding to FIGS. 9, 10, and 11, respectively.

FIGS. 9 to 11 are simplified diagrams illustrating the operation of the workpiece conveyance device 10 of this embodiment. FIG. 9 shows a state in which the workpiece conveyance device 10 holds a workpiece W (not shown) of the press device 200 on the upstream side. FIG. 10 shows a state in which the workpiece conveyance device 10 is conveying the workpiece W (not shown) to the press device 210 on the downstream side. FIG. 11 shows a state in which the workpiece conveyance device 10 is disposing a workpiece W (not shown) in the press device 210 on the downstream side. FIGS. 12A, 12B, and 12C are simplified side views of the workpiece conveyance device 10 in states corresponding to FIGS. 9, 10 and 11, respectively.

In the state shown in FIGS. 9 and 12A, the lift carrier 12 is positioned below. As shown in FIG. 9, when the servo motor of the driver 160 of the first lever support part 16 is driven in a state in which the workpiece W is held, the first lever 51 pivots around the axis A, which is the pivoting center of the first lever 51, and with the upper side of the axis A facing the upstream side in the conveyance direction X (see the arrow K1).

As shown in FIGS. 9 and 10, as this first lever 51 pivots, the slider arm 52 slides upward (see the arrow K2), and pivots such that the lower end 52b moves to the downstream side in the conveyance direction X, with the pivoting center being the axis C, which is the center of the hole 173a in the carrier base 173 (see the arrow K3). In the state shown in FIGS. 10 and 12B, the lift carrier 12 is positioned above.

When the first lever 51 pivots to the upstream side in the conveyance direction X beyond the axis A, the slider arm 52 slides downward (see the arrow K4) as the first lever 51 pivots, and then further pivots around the axis C as shown in FIG. 11. At this point, as shown in FIG. 12C, the lift carrier 12 is positioned below. The drivers 22, 160, 71, etc., drive so that the workpiece W held by the suction pads provided to the crossbar 54 moves in the conveyance direction X while maintaining the set inclination, along with the movement of the first lever 51 and the slider arm 52.

The workpiece W can be moved in the conveyance direction X as described above. When the crossbar 54 is moved to the upstream side in order to convey the next workpiece W, the reverse operation to that described above is executed.

Also, as shown in FIGS. 12A to 12C, the slider arm moves from a state of being inclined at the suction point at which the workpiece W is held by suction (FIG. 12A) and the release point at which the workpiece W is released (FIG. 12C), to an intermediate point at which the slider arm 52 is upright (FIG. 12B), so the pivot point moves a considerable distance up and down when the work W is conveyed. This up and down movement limits the speed of the workpiece conveyance. In view of this, it is possible to increase the work conveyance speed by using a double-speed mechanism (the transmission mechanism 24) as in this embodiment.

3. Features (3-1)

The workpiece conveyance device 10 in this embodiment is the workpiece conveyance device 10 used for the press devices 200 and 210, and comprises the lever unit 14 (an example of a support component), the lift carrier 12 (an example of a first movement member), the middle carrier 21 (an example of a second moving member), the driver 22, and the transmission mechanism 24. The lever unit 14 supports the holders 15 that detachably hold the workpiece W. The lift carrier 12 is movable in the up and down direction, and pivotably supports the lever unit 14. The middle carrier 21 is movable in the up and down direction. The driver 22 moves the middle carrier 21 in the up and down direction. The transmission mechanism 24 transmits the up and down movement of the middle carrier 21 to the lift carrier 12 so as to move the lift carrier 12 in the up and down direction in conjunction with the up and down movement of the middle carrier 21, and makes the amount of movement of the lift carrier 12 greater than the amount of movement of the middle carrier 21.

In conjunction with the movement of the middle carrier 21 thus moved by the driver 22, the lift carrier 12 moves by an amount that is larger than the movement amount of the middle carrier 21. Consequently, the movement of the lift carrier 12 can be made faster than that of the middle carrier 21, and the movement distance can also be increased.

Therefore, it is possible to improve the speed of raising and lowering in the workpiece conveyance device 10, and the workpiece W can be conveyed more quickly.

(3-2)

The workpiece conveyance device 10 in this embodiment further comprises the carrier support frame 11 (an example of a frame). The carrier support frame 11 supports the lift carrier 12 (an example of a first moving member) and the middle carrier 21 (an example of a second moving member) movably in the up and down direction. The movement amount of the lift carrier 12 is the movement amount (L2) of the lift carrier 12 with respect to the carrier support frame 11, and the movement amount of the middle carrier 21 is the movement amount (L1) of the middle carrier 21 with respect to the carrier support frame 11. Consequently, the lift carrier 12 and the middle carrier 21 can move along the carrier support frame 11.

(3-3)

With the workpiece conveyance device 10 in this embodiment, the transmission mechanism 24 has the rack 243 (an example of a first rack), the pinion 241 (an example of a first pinion), and the rack 242 (an example of a second rack). The rack 243 (an example of a first rack) is disposed in the up and down direction on the lift carrier 12 (an example of a first moving member). The pinion 241 is rotatably disposed on the middle carrier 21 (an example of a second moving member) and meshes with the rack 243 (an example of a first rack). The rack 242 is fixed to the carrier support frame 11 along the up and down direction and meshes with the pinion 241.

Thus using the pinion 241, the rack 242, and the rack 243 as a mechanism for transmitting the movement of the middle carrier 21 to the lift carrier 12 affords more accurate design and also improves durability.

(3-4)

With the workpiece conveyance device 10 in this embodiment, the driver 22 has the electric motor 220 as its drive source.

This allows raising and lowering operations to be performed more accurately.

(3-5)

The workpiece conveyance device 10 in this embodiment further comprises the conversion mechanism 23. The conversion mechanism 23 converts movement in the rotational direction of the electric motor into up and down movement of the middle carrier 21 (an example of a second moving member).

This allows the middle carrier 21 to be moved in the up and down direction by the drive of the electric motor 220, and also allows the lift carrier 12 to move in the up and down direction.

(3-6)

With the workpiece conveyance device 10 in this embodiment, the conversion mechanism 23 has the rack 232 (an example of a third rack) and the pinion 231 (an example of a second pinion). The rack 232 is disposed in the up and down direction on the middle carrier 21 (an example of a second moving member). The pinion 231 meshes with the rack 232 and is rotated by the electric motor 220.

This allows the rotational drive of the electric motor 220 to be transmitted to the middle carrier 21.

(3-7)

The workpiece conveyance device 10 in this embodiment further comprises the balancer cylinder 26. The balancer cylinder 26 imparts a force to pull up the middle carrier 21 (an example of a second moving member).

This reduces the load exerted on the driver 22 with respect to movement of the middle carrier 21. Also, since the balancer cylinder 26 is provided to the middle carrier 21, the stroke can be shorter than when the balancer cylinder 26 is provided to the lift carrier 12 (an example of a first moving member), and the size of the apparatus in the up and down direction can be reduced.

(3-8)

With the workpiece conveyance device 10 in this embodiment, the lift carrier 12 (an example of a first moving member) is substantially flat, and the middle carrier 21 (an example of a second moving member) is also substantially flat.

As a result, the workpiece conveyance device 10 can be made more compact.

(3-9)

With the workpiece conveyance device 10 in this embodiment, the lift carrier 12 (an example of a first moving member) is substantially flat in shape, the middle carrier 21 (an example of a second moving member) is substantially flat in shape, and the lift carrier 12 (an example of a first moving member) and the middle carrier 21 (an example of a second moving member) are disposed on the carrier support frame 11 (an example of a frame) so that their faces are perpendicular to each other.

As a result, the workpiece conveyance device 10 can be made compact.

4. Other Embodiments

An embodiment of the present invention was described above, but the present invention is not limited to or by the above embodiment, and various modifications are possible without departing from the gist of the invention.

(A)

Figure 13:
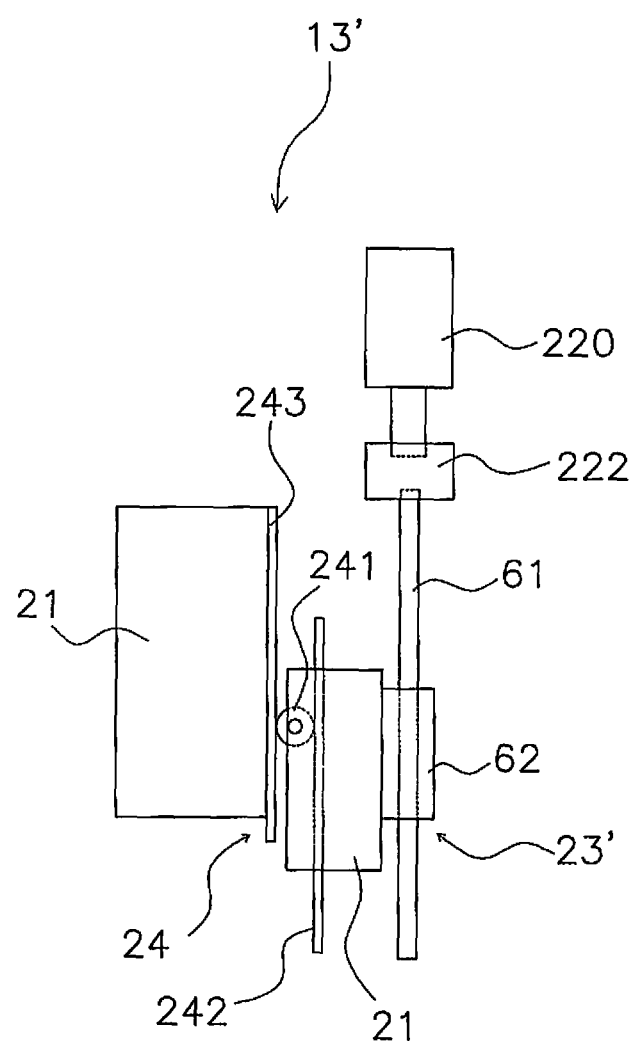
FIG. 13 is a simplified view of the configuration of a carrier drive mechanism of the workpiece conveyance device in a modification example of an embodiment of the present invention.

With the carrier drive mechanism 13 in the above embodiment, the conversion mechanism 23 has the pinion 231 and the rack 232, but this is not the only option. For example, as shown in FIG. 13, a ball screw may be used instead. FIG. 13 is a diagram showing the simplified configuration of a carrier drive mechanism 13' in a modification example of this embodiment. The carrier drive mechanism 13' shown in FIG. 13 is provided with a conversion mechanism 23' having a ball screw 61 instead of the conversion mechanism 23 of the above embodiment. The conversion mechanism 23' has the ball screw 61 and a block 62 that threads onto the ball screw 61. The ball screw 61 is rotatably fixed to the above-mentioned carrier support frame 11. The electric motor 220 of the driver 22 is linked to the ball screw 61 via a reduction gear mechanism 222 or the like. The electric motor 220 is disposed such that its rotational axis is coaxial with the rotational axis of the ball screw 61. The block 62 is fixed to the middle carrier 21. The block 62 has a through-hole into which the ball screw 61 is inserted, and the threads formed on the inner peripheral face of the through-hole mesh with the threads formed on the surface of the ball screw 61.

With this configuration, when the electric motor 220 rotates, the rotation of the ball screw 61 causes the middle carrier 21 to move in the up and down direction together with the block 62, and the lift carrier 12 is also moved in the up and down direction by the transmission mechanism 24 as the middle carrier 21 moves.

In FIG. 13, the electric motor 220 is disposed coaxially with the ball screw 61, but the electric motor 220 and the ball screw 61 may be disposed in parallel, and the rotational force of the electric motor 220 may be transmitted to the ball screw 61 by a pulley and belt or the like.

Also, belt drive may be used in place of the conversion mechanism 23' using the ball screw 61. The configuration may be such that the middle carrier 21 is linked to the belt, and the belt is rotated by the electric motor 220.

(B)

Figure 14:
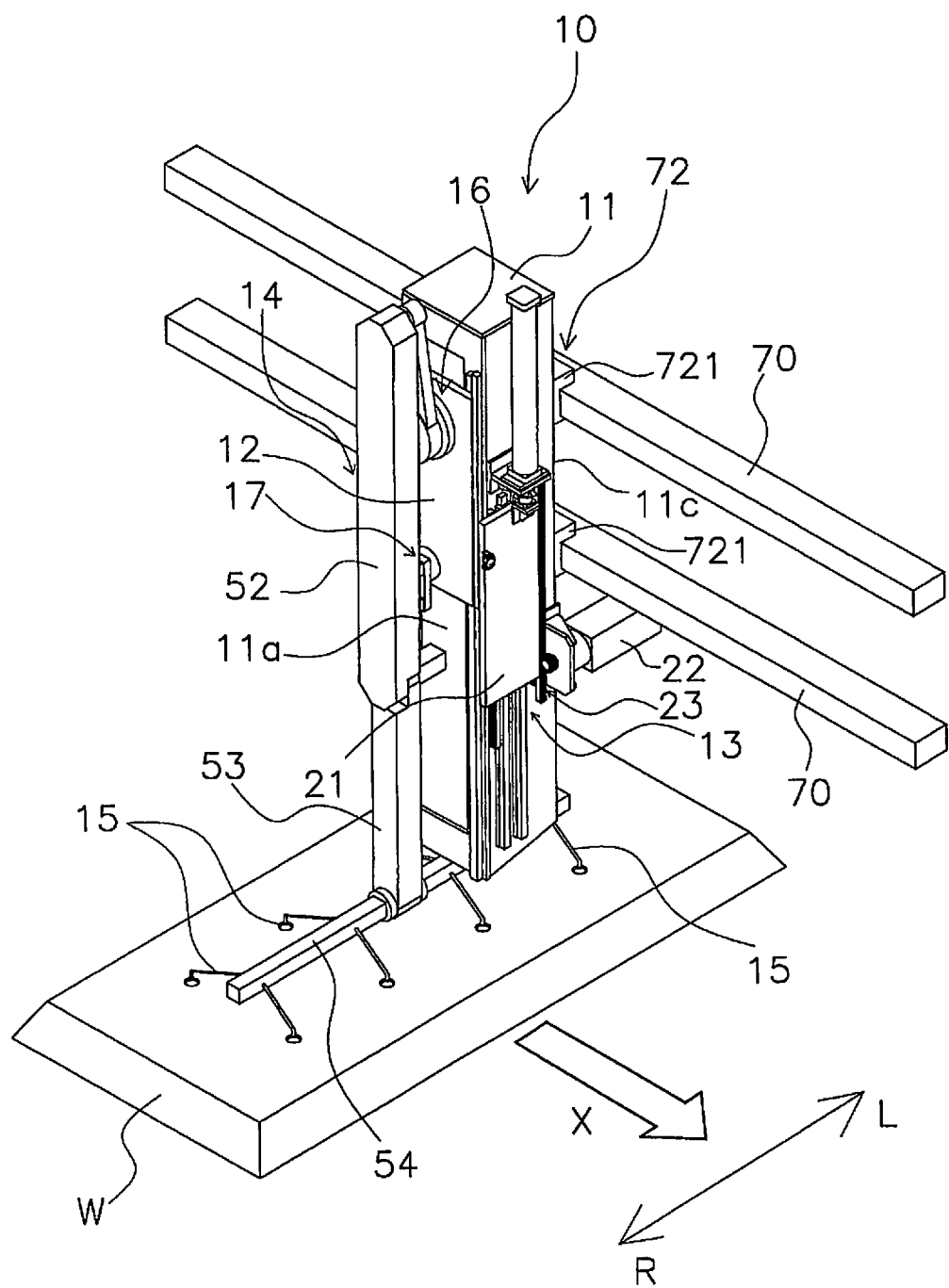
FIG. 14 is an oblique view showing a workpiece conveyance device in a modification example of an embodiment of the present invention.

With the workpiece conveyance device 10 in the above embodiment, the carrier support frame 11 is fixed to the attachment frame 205 and cannot move in the conveyance direction X, but the carrier support frame 11 may be movable in the conveyance direction X. FIG. 14 is a diagram showing a configuration in which the workpiece conveyance device 10 can move. For example, when the press device 200 and the press device 210 are spaced apart from each other, a pair of upper and lower guide frames 70 is disposed between the press device 200 and the press device 210. A movement mechanism 72 provided to the workpiece conveyance device 10 has a block 721 fitted to the guide frames 70 so as to be slidable in the conveyance direction X, a linear motor (not shown), and so forth. A pair of upper and lower blocks 721 is disposed on the left side face 11*c* on the left direction L side of the carrier support frame 11. The linear motor has a coil disposed in each block 721 and a magnet disposed in each guide frame 70, and the workpiece conveyance device 10 can be moved in the conveyance direction X by sending an electric current through the coils.

This makes it possible to deal with situations when the distance between the press devices is long.

(C)

Figure 15:
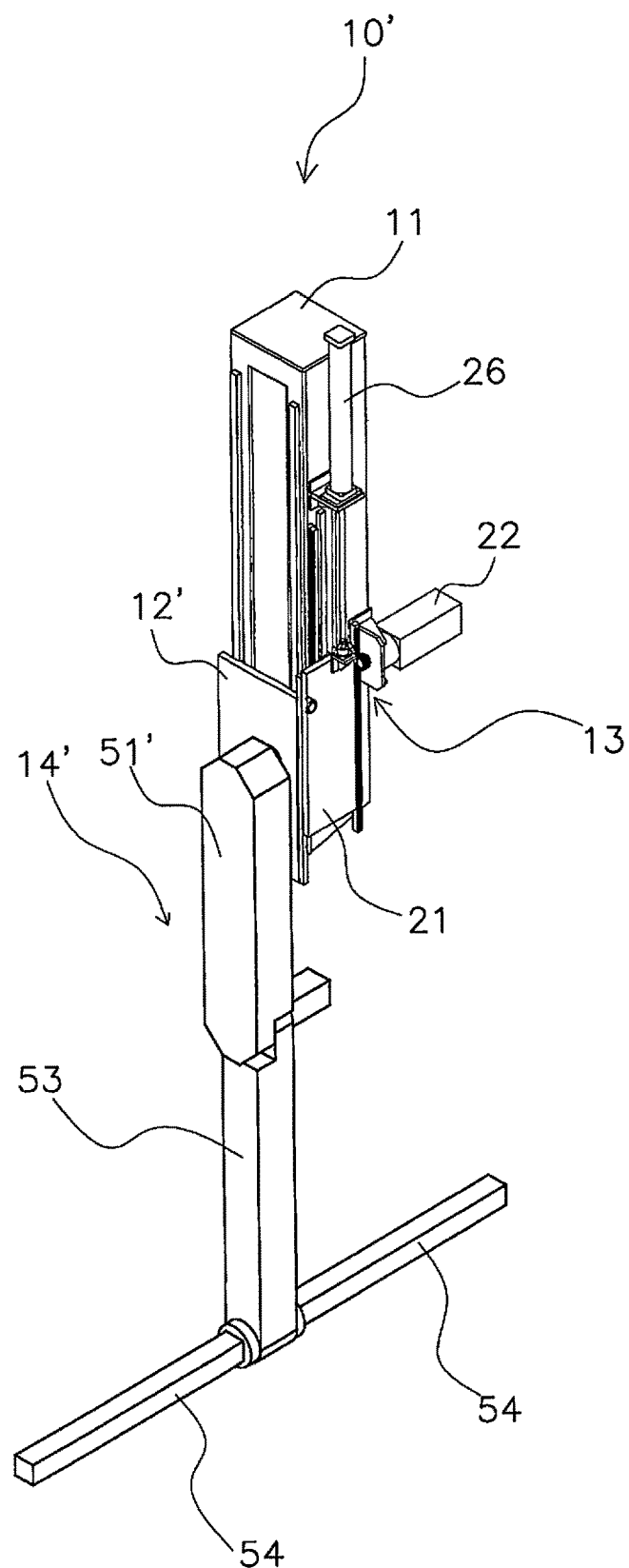
FIG. 15 is an oblique view showing a workpiece conveyance device in a modification example of an embodiment of the present invention.

With the workpiece conveyance device 10 in the above embodiment, the lever unit 14 is supported by the lift carrier 12 so as to be slidable and rotatable in the second lever support part 17, but may not be supported in the second lever support part 17. In FIG. 15, a lever unit 14' is rotatably supported by a lift carrier 12' at one location. The lever unit 14' has a first lever 51', a second lever 53, and a crossbar 54. The first lever 51' is rotatably supported at its proximal end by the lift carrier 12'. The second lever 53 is rotatably supported by the distal end of the first lever 51'. The crossbar 54 is attached to the distal end of the second lever 53 as in the above embodiment.

As shown in FIG. 15, the configuration of the present invention may be applied to a workpiece conveyance device 10' configured such that the lever unit 14 rotates rather than sliding.

(D)

In the above embodiment, the lever unit 14 is provided with the first lever 51, the slider arm 52, the second lever 53, and the crossbar 54, but these components may be added or omitted as needed. For instance, a linking mechanism may be provided between the slider arm 52 and the second lever 53 so as to rotate the second lever 53 around the longitudinal direction.

(E)

In the above embodiment, the workpiece conveyance device 10 conveys the workpiece W between the press devices 200 in a tandem press, but this is not the only option, and the workpiece conveyance device 10 may also be used to convey a workpiece W between a plurality of dies in a single press device. Also, it may be used for loading the workpiece W from a conveyance device such as a belt conveyor to the press device 200, or may be used for unloading the workpiece W from the press device 200 to a conveyance device such as a belt conveyor.

The present invention has the effect of making it possible to improve the conveyance speed of a workpiece, and is useful as a press line system or the like.

The invention claimed is:

1. A workpiece conveyance device used for a press device, the workpiece conveyance device comprising:
    a support component supporting a holder, the holder detachably holding a workpiece;
    a first moving member movable in an up and down direction, the first moving member pivotably supporting the support component;
    a second moving member movable in the up and down direction;
    a driver configured to move the second moving member in the up and down direction; and
    a transmission mechanism configured to transmit an up and down movement of the second moving member to the first moving member so as to move the first moving member in the up and down direction in conjunction with the up and down movement of the second moving member, the transmission mechanism causing an amount of movement of the first moving member greater than an amount of movement of the second moving member.

2. The workpiece conveyance device according to claim 1, further comprising:
    a frame supporting the first moving member and the second moving member movably in the up and down direction,
    the amount of movement of the first moving member being an amount of movement of the first moving member with respect to the frame, and
    the amount of movement of the second moving member being an amount of movement of the second moving member with respect to the frame.

3. The workpiece conveyance device according to claim 2, wherein
    the transmission mechanism includes
        a first rack disposed along the up and down direction on the first moving member,
        a first pinion rotatably disposed on the second moving member, the first pinion meshing with the first rack, and
        a second rack fixed to the frame along the up and down direction, the second rack meshing with the first pinion.

4. The workpiece conveyance device according to claim 1, wherein
    the driver includes an electric motor as a drive source thereof.

5. The workpiece conveyance device according to claim 4, further comprising:
    a conversion mechanism configured to convert a movement of the electric motor in a rotation direction into movement of the second moving member in the up and down direction.

6. The workpiece conveyance device according to claim 5, wherein
    the conversion mechanism includes
        a third rack disposed along the up and down direction on the second moving member, and
        a second pinion meshing with the third rack, the second pinion being configured to be rotated by the electric motor.

7. The workpiece conveyance device according to claim 1, further comprising:
a balancer cylinder configured to impart a force to pull the second moving member upward.

8. The workpiece conveyance device according to claim 1, wherein
the first moving member has a substantially flat plate shape, and
the second moving member has a substantially flat plate shape.

9. The workpiece conveyance device according to claim 2, wherein
the first moving member has a substantially flat plate shape,
the second moving member has a substantially flat plate shape, and
the first moving member and the second moving member are disposed on the frame such that faces of the first moving member and the second moving member are perpendicular to each other.

10. The workpiece conveyance device according to claim 2, further comprising:
a movement mechanism configured to move the frame in a workpiece conveyance direction.

* * * * *